United States Patent [19]

Marianowski et al.

[11] Patent Number: 4,579,788
[45] Date of Patent: Apr. 1, 1986

[54] HIGH TEMPERATURE FUEL CELL WET SEAL

[75] Inventors: Leonard G. Marianowski, South Holland; Terry D. Claar, Lisle, both of Ill.

[73] Assignee: Institute of Gas Technology, Chicago, Ill.

[21] Appl. No.: 543,130

[22] Filed: Oct. 18, 1983

[51] Int. Cl.[4] .................. H01M 8/14; H01M 2/08
[52] U.S. Cl. ........................................ 429/16; 429/36
[58] Field of Search ................. 429/34, 35, 36, 16

[56] References Cited

U.S. PATENT DOCUMENTS 3,514,333  5/1970  Novack ............................... 220/240
4,160,067  7/1979  Camara et al. ..................... 429/16
4,279,970  7/1981  Breault et al. ..................... 429/35
4,450,212  5/1984  Feigenbaum et al. ............. 429/35

Primary Examiner—Anthony Skapars
Attorney, Agent, or Firm—Thomas W. Speckman

[57] ABSTRACT

High temperature fuel cell wet seal strips around the periphery of a separator plate fabricated utilizing powder metallurgy technique. The material composition of said wet seal may be variably graded to afford ease of bonding of said wet seal with the separator plate on one side and provide corrosion inhibition on the other side in communication with an electrolyte. Similar wet seals may be formed from a single metal powder with surface treatment of the surface adjacent the electrolyte to provide resistance to corrosion by the electrolyte.

20 Claims, 3 Drawing Figures

HIGH TEMPERATURE FUEL CELL WET SEAL

BACKGROUND OF THE INVENTION

1. Field of the Invention

This invention relates to wet seals generally, and in particular, wet seals for use in high temperature fuel cells. Fuel cells have been widely sought for their ability to directly convert chemical energy into electrical energy through electrochemical means. In molten carbonate fuel cells, the chemical energy of hydrocarbons is converted directly into electrical energy by a, galvanic oxidation/reduction process.

Generally, fuel cells are comprised of a multiplicity of individual cells, separated by inert or bi-polar ferrous metal separator plates. The individual cells are sandwiched together and secured into a single unit to achieve the desired fuel cell energy output. Each individual cell generally consists of an anode and cathode electrode, a common electrolyte tile and a fuel and oxidant gas source. Both gas sources are introduced through manifolds to their respective reactant chambers formed by peripheral spacer strips between the separator plate and electrolyte tile. It is the area of contact between the electrolyte and the separator plate peripheral spacer strips or the fuel cell housing which is known as the wet seal.

A major factor attributing to premature fuel cell failure is corrosion and fatigue of the fuel cell housing, especially in the wet seal area. This mode of failure is hastened by corrosive electrolyte contact at high temperatures and high thermal stresses placed on the fuel cell members, especially thermal stresses resulting from large temperature variations of thermal cycling, thereby causing weakening of the fuel cell structure through intracrystalline and transcrystalline cracking. These failures permit gas crossover. Fuel and/or oxidant gas crossover interrupts the intended oxidation and reduction reactions thereby causing breakdown and eventual stoppage of cell current generation.

Molten carbonate electrolytes are very corrosive to ferrous metals which are required for their strength in fuel cell housings and separator plates. The high temperature operation of molten carbonate fuel cells increases both the corrosion and thermal stress problems in the wet seal areas, especially when the thermal coefficients of expansion of adjacent materials is different.

2. Description of the Prior Art

In recent years considerable effort has been made to provide effective sealing to prevent premature failure of fuel cells due to corrosion of the fuel cell housing in the wet seal regions in contact with the fuel cell electrolyte and to provide physical stability with high temperature thermal cycling.

One method utilized to mitigate the corrosion rate of the fuel cell housing referred to in this disclosure and claims as "separator plate" to refer both to the external cell housing of end cells and separators of internal cells of a stacked assembly, is to bond, by welding or brazing, solid metal corrosion resistant strips to the ferrous metal separator plate in regions susceptible to electrolyte corrosion. These metal strips typically are an expensive, high temperature metal alloy suitable to withstand the corrosive environment of the fuel cell electrolyte. These metal alloy strips serve as inert wet seals to prevent direct contact of the electrolyte with the ferrous separator plate preventing galvanic corrosion of the separator plate. To provide intake and exhaust manifolds, the metal alloy strips must be machined or drilled.

A number of disadvantages have resulted where metal alloy strips are welded or brazed to the separator plate to provide a non-corrosive wet seal. Often, distortion and warpage to the separator plate itself results from the localized high thermal gradients and stresses experienced during the process of joining the high temperature alloy strips to a thin separator plate. A warped or distorted separator plate in turn, loses much of its intended ability to maintain complete oxidant and reactant gas chamber separation and leads to premature failure of the fuel cell. Because the separator plate also serves as the primary structural load bearing member of the fuel cell, distortion of this structural member may cause the entire cell assembly to shift and distort resulting in the likelihood of cracking of the electrodes and/or electrolyte tile.

A wide variety of attempts have been made to prevent electrolyte corrosion of a fuel cell housing or separator plates to provide stable long term cell operation. These problems are most severe with corrosive electrolytes and high temperature thermal cycling.

U.S. Pat. No. 3,723,186 discloses stacked high temperature electrochemical cells wherein the electrolyte itself is comprised of inert materials in regions about its periphery, to establish an integral inert peripheral seal between the electrolyte and fuel cell housing. This type of wet seal requires strict tolerances be maintained in the manufacture of an electrolyte containing these limited regions of inert material. Should these tolerances slightly vary, undesired electrolyte creepage or gas crossover may occur. Moreover, should the electrolyte contain inert material in excess of tolerance limits, blockage of the intended oxidation/reduction reactions occur in regions where the electrolyte, gas and electrode meet. Where this happens, the energy output of the cell may be significantly reduced.

U.S. Pat. No. 4,160,067 discloses another wet seal for high temperature molten carbonate fuel cells wherein inert materials are deposited directly onto, or impregnated into, the fuel cell housing. U.S Pat. No. 4,329,403 teaches an electrolyte-electrode assembly for high temperature fuel cells in which the molten carbonate electrolyte has a graded composition for more gradual transition in the coefficient of thermal expansion in going from the electrodes to the inner electrolyte region. U.S. Pat. No. 3,514,333 teaches housing of molten carbonate electrolytes in high temperature fuel cells by use of a thin aluminum sealing gasket.

The sealing and corrosion problems are not as severe in the wet seal areas of low temperature electrolytic cells. U.S. Pat. No. 3,867,206 teaches gas sealing by the ends of the electrodes and a peripheral matrix between the ends of the electrodes and separators being impregnated with electrolyte to provide the wet seal. This wet seal method is not suitable for high temperature cells using highly corrosive electrolytes. Another wet seal suitable for low temperature fuel cells is taught by U.S. Pat. No. 4,259,389 to be made of granular inert material bonded with polytetrafluoroethylene, which again is not suitable for high temperature fuel cells.

SUMMARY OF THE INVENTION

The high temperature fuel cell wet seal of this invention utilizes powder metallurgical formed peripheral spacer strips of wet seals which may be of graded composition. The graded composition provides suitable composition adjacent to the ferrous metal separator plate for bonding and suitable composition adjacent the electrolyte to provide excellent corrosion resistance. The composition of the wet seal may be easily varied to provide corrosion resistance to various electrolytes and bonding to various materials for separator plates or fuel cell housings. The wet seal fabrication method disclosed herein, provides a means of forming and bonding directly to the separator plate a wet seal strip which may be variably graded The invention may also be practiced by using a single metal powder to form the wet seal strips on the separator plate and suitably treating the surface of the wet seal adajcent the electrolyte to resist corrosive action, such as aluminizing the surface when alkali metal carbonates are used as an electrolyte.

The powder metallurgical formed wet seal strip does not involve use of extreme localized heating thereby avoiding warpage and distortion problems of thin separator plates caused by welding or brazing of wet seal strips to the separator plate. The fabrication method of this invention provides bonding of powdered metal wet seal strips to the separator plate by powder metallurgy techniques wherein metallic powder may be pressed and sintered directly to the separator plate. Use of powder metallurgy techniques to form the wet seal strips is of particular advantage in cases where the separator plate is of ribbed or corrugated geometry. In the past, ribbed or corrugated separator plates had to be provided with a flat perimeter surface for wet seal strips. By use of powder metallurgy techniques of this invention, a ribbed or corrugated separator sheet may be bonded directly to the wet seal strip because the metal powders, themselves, act as filler material in the ribbed or corrugated depressed regions of the separator plate. Further, inlet and exhaust gas porting for gas manifolds may be directly formed in the powder metallurgy formed wet seal strips. The wet seals of this invention are particularly well suited for molten carbonate fuel cells which utilize an electrolyte corrosive to ferrous metals and require high temperature operation. The wet seals of this invention are suitable for any high temperature fuel cell, such as alkaline fuel cells using metal separator plates and acid fuel cells using carbon separators and suitably modified wet seal materials.

Accordingly, it is an object of this invention to provide a high temperature fuel cell wet seal of graded composition to inhibit electrolyte corrosion of the fuel cell separator plate or peripheral spacer.

It is yet another object of this invention to provide a wet seal with compatible characteristics to the separator plate on one side and to the electrolyte on the other side.

It is another object of this invention to provide a high temperature wet seal formed by powder metallurgical techniques having readily molded gas manifold ducts therein.

BRIEF DESCRIPTION OF THE DRAWINGS

The above mentioned and other features of this invention and manner of obtaining them will become more apparent, and the invention itself will be best understood by reference to the following description of preferred embodiments of the invention taken in conjunction with the accompanying drawings in which.

DESCRIPTION OF THE PREFERRED EMBODIMENTS

Figure 1:
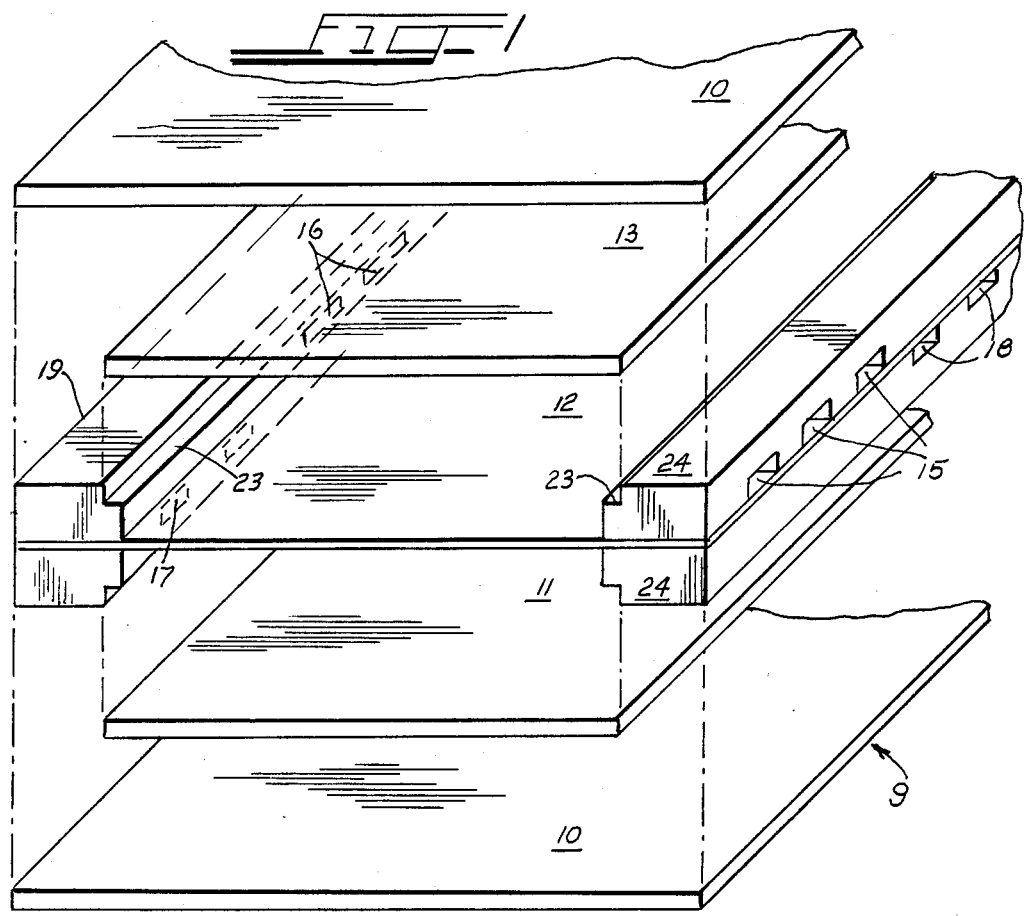
FIG. 1 is an expanded schematic perspective view showing the components of a fuel cell.

In FIG. 1, a portion of a high temperature fuel cell 9 according to one embodiment of this invention is schematically shown through a central portion of the cell, not showing the end wet seal spacers. The components include electrolyte tile 10, cathode 11, separator plate 12, anode 13 and peripheral wet seal spacer or frame 19. Fuel gas inlet ports 15, fuel gas exhaust ports 16, oxidant gas inlet ports 17, and oxidant gas exhaust ports 18 are shown molded into the wet seal spacer of this invention. Typically, a commercial fuel cell has a plurality of individual fuel cells 9 sandwiched and fastened together.

Figures 2, 3:
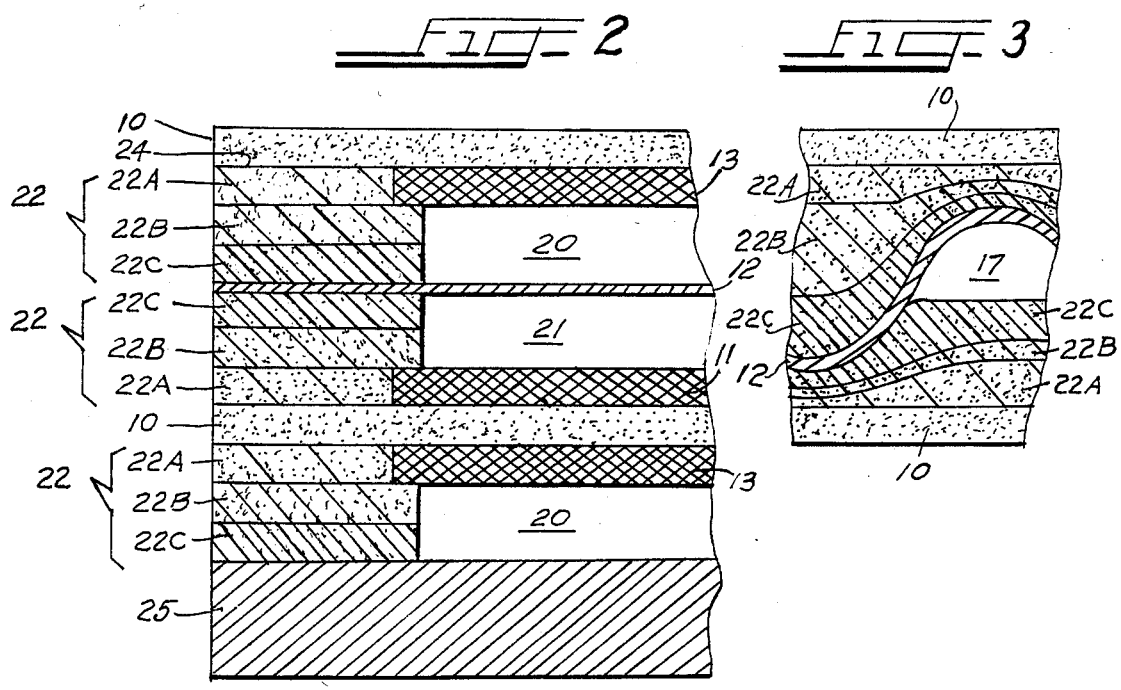
FIG. 2 is an enlarged, schematic sectional view of the wet seal region shown in FIG. 1 in accordance with one embodiment of this invention.
FIG. 3 is an enlarged, schematic section view of another wet seal region in accordance with another embodiment of this invention.

An individual assembled fuel cell 9, has its elements sandwiched together in a fashion as schematically shown in FIG. 2. Thus, in one complete fuel cell the separator plate 12, which serves the dual function of providing structural integrity to the fuel cell as a load bearing member, also separates fuel gas chamber 20 from oxidant gas chamber 21. These chambers are formed by peripheral strips 22 sandwiched between adjacent separator plates 12 and electrolyte tile 10. While the figures show separator plates 12 extending to the periphery of wet seal strips 22, they may be inward from the edge and the wet seal strips enclose the edges. Anode 13 and cathode 11, are both in direct communication with electrolyte tile 10, at one surface. On their opposite surfaces, cathode 11 and anode 13, are respectively, in substantial communication with fuel chamber 20 and oxidant chamber 21. The outer perimeter of cathode 11 and anode 13 are held in place by recesses in the surfaces of separator peripheral strips 22. As shown in the lower portion of FIG. 2, the end gas chamber 20 may be bounded by cell housing 25 which may have the same upstanding wet seal as described above with respect to separator peripheral strips 22. For the purpose of the following description and claims the term "separator" is meant to include also the cell housing in the case of the end cells of a sandwich structure.

The wet seal region 22 of this invention may be comprised of a single uniform material which is bonded to the separator plate and rendered noncorrosive by the electrolyte by surface treatment of the surface in contact with the electrolyte. In a preferred embodiment, wet seal 22 may be comprised of a graded material composition schematically shown as 22a, 22b, 22c, to provide a wet seal portion 22A which is particularly corrosion resistant to the electrolyte, which has an adjacent wet seal portion 22B of suitable material composition to exhibit good bonding characteristics with adjacent wet seal portions 22a and 22c, and portion 22C of suitable material composition to exhibit particularly good bonding with separator plate 12. The entire wet seal 22 must be of sufficient density and low porosity so as to prevent gas escape from gas chambers 20, 21 and to provide structural strength to withstand anticipated load forces of the fuel cell assembly.

The powder metallurgically formed separator plate perimeter strips referred to herein and in the claims as wet seals, are suitably applied to flat separator plates and are especially suited for fully corrugated separator plates which do not have flat surfaces at the ends, but are corrugated for their full length. Such corrugated or ribbed separator plates are especially well suited for molding gas inlet and outlet ports into the wet seals in association with the corrugations. One embodiment of this aspect of the invention is shown in FIG. 3 showing graded composition wet seal (22A, 22B, 22C) forming fuel gas inlet port 17 in association with corrugated or ribbed separator plate 12. It is readily apparent that fuel gas ports and oxidant gas ports may be provided as desired to furnish cocurrent or countercurrent flow. When flat separator plates are used, cross flow of these gases may be provided by forming the gas ports in the desired locations in the proximity of the separator plates, such as through regions 22B and 22C.

The separator plate 12 may be comprised of any suitable material composition providing desired physical strength and gas separation. In embodiments utilizing stacked cells it is preferred to use bimetallic separator plates in which it is suitable to use stainless steel on the cathode side and nickel or copper on the anode side to avoid ferrous metal corrosion. Separator plates may also be fabricated from ferrous alloys, such as type 300 series stainless steel alloys. The separator plates serve the dual function of both providing a non-reactive gas chamber separator as well as providing structural strength to the fuel cell as an internal load bearing member. The internal separator plates are desirably very thin sheets, in the order of 0.010 inch.

The wet seal 22 may be comprised of any suitable material to accomplish the above objects dependent upon the material of the separator plate and the material of the electrolyte. The surface of the wet seal adjacent the electrolyte is desirably chemically inert to the electrolyte at fuel cell operating conditions. The surface of the wet seal adjacent the separator plate is desirably of a composition which may be bonded to the separator plate and possess a similar coefficient of thermal expansion to avoid thermal stressing between the wet seal and the separator plate. The powdered metal particle formation of the wet seal according to this invention provides a graded composition of the wet seal as desired to obtain benefits of differing compositions at opposite faces of the wet seal. For example, where the fuel cell has an electrolyte tile comprising alkali carbonates such as potassium, sodium and lithium carbonates and a separator plate of type 300 series stainless steel, we have found that by grading the composition of the wet seal 22 with about 80 to about 95 volume percent aluminum and about 20 to about 5 volume percent 300 series stainless steel in region 22A adjacent the electrolyte; about 40 to about 60 volume percent aluminum and about 40 to about 60 volume percent 300 series stainless steel in central region 22B; and about 80 to about 100 volume percent 300 series stainless steel and about 0 to about 20 volume percent aluminum in region 22C adjacent the separator plate is suitable. Particularly preferred for this type of fuel cell is a wet seal with about 87 to about 93 percent aluminum and about 7 to about 13 percent stainless steel in region 22A, about 45 to about 55 percent aluminum and stainless steel in region 22B, and about 95 to 100 percent stainless steel and 0 to about 5 percent aluminum in region 22C. It must be recognized that the above proportions represent averages of the graded compositions and that regions 22A, 22B and 22C are not discrete regions, but are useful in description of the generally graded composition of the wet seal. The above graded compositions are illustrative of suitable compositions for wet seals useful in high temperature molten carbonate fuel cells with stainless steel separator plates. Other graded compositions will be readily apparent for use with other electrolytes and other separator plate materials. The compositions set forth above provide excellent corrosion resistance to the carbonates electrolyte at one face and good bonding to the separator plate at the opposite face while providing desired load bearing structural support.

The invention may also be practiced by producing the desired wet seal form by powdered metallurgical techniques as above using a single metal powder compatible with the separator plate and then aluminizing the wet seal surface in the manner described in U.S. Pat. No. 4,160,067 to provide the wet seal surface with about 2 to about 70 weight percent aluminum concentration.

The wet seal 22 of this invention may be formed using known powder metallurgy techniques. A receiving die is provided to form the combined shape of the wet seal and desired gas inlets and outlets. Metal powders of the composition sought are layered into the die whereby the composition of wet seal region 22A is placed at the bottom of the die, then the composition of wet seal region 22B, powders, and the composition of wet seal region 22C is placed on top of the wet seal region 22B powders. The powder metal may then be pressed at about 60,000 psi to form green compacts. Compression in this order provides good density characteristics so as to prevent gas and electrolyte migration through the wet seal. The green compacts may be sintered at suitable temperatures to provide desired sintering and bonding to the separator plates. The green compacts may be formed separate from the separator plate, or preferably, may be pressed in conjunction with the separator plate and in such case may preferably extend beyond the edge of the separator plate so that regions 22C of the wet seals on opposite sides of the separate plate form a contiguous wet seal. In practice, gas port plugs of appropriate port dimensions may be placed into the die prior to adding the powdered metal to the die. After the wet seal is formed, the port plugs may be removed by mechanically tapping them out, or if suitable material is used, the plugs may be burned out during the sintering process.

In tests, we have prepared wet seals of graded composition varying from 10/90 percent stainless-/aluminum to 100 percent stainless from 304 stainless steel powders of the following size range:

| Mesh | Weight Percent |
| --- | --- |
| +80 | 0.04 |
| −80 + 100 | 1.38 |
| −100 + 200 | 29.77 |
| −200 + 230 | 4.70 |
| +230 + 325 | 28.70 |
| −325 | 35.41 | and aluminum powders of −200 to +325 mesh. Green compacts were formed by pressing at 60,000 psi and sintering was performed at 1150° C. for 1 hour under a hydrogen blanket atmosphere. Good bonding to a 0.010 inch thick 316 stainless steel sheet was obtained, acid-etched metallurgical cross section micrographs showing bond with both flat and corrugated stainless steel sheets.

While in the foregoing specification this invention has been described in relation to certain preferred embodiments thereof, and many details have been set forth for purpose of illustration, it will be apparent to those skilled in the art that the invention is susceptible to additional embodiments and that certain of the details disclosed herein can be varied considerably without departing from the basic principles of the invention.

We claim:

1. In a high temperature fuel cell of the type comprising oxidant and fuel gas compartments at least partially bounded by a metal separator plate having peripheral upstanding wet seal strips, the face of said wet seal strips removed from said separator plate in contact with an electrolyte, the improvement of said wet seal strips comprising powdered metal particles formed into a substantially gas impervious and force resistant structure by forming under pressure and sintering at elevated temperature.

2. The wet seal strips of claim 1 wherein said powdered metal particles comprise mixtures of different metal particles.

3. The wet seal strips of claim 2 wherein said powdered metal particle composition adjacent said separator plate provides bonding of said powdered metal particles to said separator plate and the powdered metal particle composition is graded to said powdered metal particle composition adjacent said electrolyte providing corrosion resistance to said electrolyte under said high temperature fuel cell operating conditions.

4. The wet seal strips of claim 1 wherein said separator plate is ribbed to its edge and said powdered metal particles fill the depressed regions to form said upstanding wet seal strips.

5. The wet seal strips of claim 4 wherein inlet and exhaust porting is formed in said wet seal strips.

6. The wet seal strips of claim 1 wherein said separator plate is corrugated to its edge and said powdered metal particles fill the depressed regions to form said upstanding wet seal strips.

7. The wet seal strips of claim 6 wherein inlet and exhaust porting is formed in said wet seal strips.

8. The wet seal strips of claim 1 wherein inlet and exhaust porting is formed in said wet seal strips.

9. The wet seal strips of claim 1 wherein said powdered metal particles comprise a single metal powder bonded to said separator plate and rendered non-corrosive by said electrolyte by surface treatment of the surface adjacent said electrolyte.

10. The wet seal strips of claim 1 wherein said separator plate is a ferrous metal alloy.

11. The wet seal strips of claim 1 wherein said separator plate is a bimetallic separator plate.

12. The wet seal strips of claim 11 wherein said bimetallic separator plate comprises stainless steel facing the cathode side and nickel facing the anode side.

13. The wet seal strips of claim 11 wherein said bimetallic separator plate comprises stainless steel facing the cathode side and copper facing the anode side.

14. The wet seal strips of claim 1 wherein said electrolyte comprises alkali carbonates and said wet seal strips in the region adjacent said alkali carbonated electrolyte comprises about 80 to 95 volume percent aluminum and about 5 to 20 volume percent of the same metal comprising the surface of said separator plate adjacent said wet seal strip.

15. The wet seal strips of claim 14 wherein the region of said wet seal strips adjacent said separator plate comprises about 0 to 20 volume percent aluminum and about 80 to 100 volume percent of the same metal comprising the surface of said separator plate adjacent said wet seal strip.

16. A method of inhibiting corrosion by high temperature fuel cell electrolytes of wet seal surfaces of wet seal strips upstanding from the periphery of a metal separator plate, said method comprising forming said wet seal strips from powdered metal particles under pressure and sintering at elevated temperature into a substantially gas impervious and force resistant structure, the surface of said wet seal strips adjacent said electrolyte providing corrosion resistance to said electrolyte under said high temperature fuel cell operating conditions.

17. The method of claim 16 wherein said powdered metal particles comprise mixtures of different metal particles.

18. The method of claim 17 wherein said powdered metal particle composition adjacent said separator plate provides bonding of said powdered metal particles to said separator plate and the powdered metal particle composition is graded to said powdered metal particle composition adjacent said electrolyte providing corrosion resistance to said electrolyte.

19. The method of claim 16 wherein inlet and exhaust porting is formed in said wet seal strips.

20. The method of claim 16 wherein said powdered metal particles comprise a single metal powder bonded to said separator plate and rendered non-corrosive by said electrolyte by surface treatment of the surface adjacent said electrolyte.

* * * * *